United States Patent
Blessent et al.

(10) Patent No.: US 11,477,743 B2
(45) Date of Patent: Oct. 18, 2022

(54) METHODS AND APPARATUS FOR COMMUNICATION OF SYNCHRONIZATION RELIABILITY

(71) Applicant: QUALCOMM Incorporated, San Diego, CA (US)

(72) Inventors: Luca Blessent, Whitehouse Station, NJ (US); Navid Abedini, Somerset, NJ (US); Muhammad Nazmul Islam, Littleton, MA (US); Jianghong Luo, Skillman, NJ (US); Tao Luo, San Diego, CA (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 16/857,145

(22) Filed: Apr. 23, 2020

(65) Prior Publication Data
US 2020/0351803 A1    Nov. 5, 2020

Related U.S. Application Data

(60) Provisional application No. 62/843,307, filed on May 3, 2019.

(51) Int. Cl.
*H04W 56/00* (2009.01)
*G01S 19/25* (2010.01)
(Continued)

(52) U.S. Cl.
CPC .......... *H04W 56/001* (2013.01); *G01S 19/25* (2013.01); *H04L 5/0051* (2013.01); *H04W 88/14* (2013.01)

(58) Field of Classification Search
CPC .......... H04W 56/0015; H04W 56/003; H04W 56/004–005
See application file for complete search history.

(56) References Cited

U.S. PATENT DOCUMENTS

2014/0226541 A1 * 8/2014 Xu ................... H04W 72/0446
370/280
2015/0117437 A1    4/2015 Abedini et al.
(Continued)

OTHER PUBLICATIONS

International Search Report and Written Opinion—PCT/US2020/029951—ISA/EPO—dated Aug. 31, 2020.
(Continued)

*Primary Examiner* — Pao Sinkantarakorn
(74) *Attorney, Agent, or Firm* — Procopio, Cory, Hargreaves & Savitch

(57) ABSTRACT

The present disclosure relates to methods and apparatus for wireless communication of a first node. The apparatus can receive a first signal from a second node of one or more additional nodes, the first signal including at least one first timing reference. The apparatus can also determine a second timing reference quality of a second timing reference. The apparatus can also transmit a second signal to at least one node of the one or more additional nodes, the second signal including a second timing reference. Additionally, the apparatus can broadcast, to the one or more additional nodes, an indication of a second timing reference quality of the second timing reference. The apparatus can also receive an indication of a first timing reference quality. Moreover, the apparatus can adjust the indication of the quality of the at least one timing first reference from the second node.

22 Claims, 9 Drawing Sheets

(51) Int. Cl.
*H04W 88/14* (2009.01)
*H04L 5/00* (2006.01)

(56) References Cited

U.S. PATENT DOCUMENTS

| | | | |
|---|---|---|---|
| 2020/0145952 A1* | 5/2020 | Keskitalo | H04W 56/007 |
| 2020/0288420 A1* | 9/2020 | Zhu | H04W 56/00 |
| 2021/0014816 A1* | 1/2021 | Bendlin | H04W 74/008 |
| 2021/0058884 A1* | 2/2021 | Liu | H04W 56/0015 |

OTHER PUBLICATIONS

NTT Docomo., et al., "Mechanism to Support the "Case-1" OTA Timing Alignment", 3GPP TSG RAN WG1 #96, 3GPP Draft; R1-1902797, 3rd Generation Partnership Project (3GPP), Mobile Competence Centre; 650, Route Des Lucioles; F-06921 Sophia-Antipo, vol. RAN WG1, No. Athens, Greece; Feb. 25, 2019-Mar. 1, 2019, Feb. 15, 2019, XP051600492, Retrieved from the Internet: URL: http://www.3gpp.org/ftp/tsg%5Fran/WG1%5FRL1/TSGR1%5F96/Docs/R1%2D1902797%2Ezip [retrieved on Feb. 15, 2019], p. 1, Paragraph Section 2, p. 2, Paragraph 1.

* cited by examiner

METHODS AND APPARATUS FOR COMMUNICATION OF SYNCHRONIZATION RELIABILITY

CROSS REFERENCE TO RELATED APPLICATION(S)

This application claims the benefit of U.S. Provisional Application Ser. No. 62/843,307, entitled "METHODS AND APPARATUS FOR COMMUNICATION OF SYNCHRONIZATION RELIABILITY" and filed on May 3, 2019, which is expressly incorporated by reference herein in its entirety.

BACKGROUND

Technical Field

The present disclosure relates generally to communication systems, and more particularly, to methods and apparatus for improved communication synchronization.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first node. The apparatus can receive a first signal from a second node of one or more additional nodes, the first signal including at least one first timing reference. The apparatus can also receive an indication of the first timing reference quality of the at least one first timing reference from the second node. The apparatus can also determine a second timing reference quality of the at least one timing reference. The apparatus can also generate the indication of the second timing reference quality of the second timing reference. Moreover, the apparatus can adjust the first timing reference quality of the at least one first timing reference. The apparatus can also reduce or increase the first timing reference quality of the at least one first timing reference. The apparatus can also transmit a second signal to at least one node of the one or more additional nodes, the second signal including a second timing reference. Additionally, the apparatus can broadcast, to the one or more additional nodes, an indication of a second timing reference quality of the at least one timing reference. The apparatus can also transmit a third signal to the at least one node of the one or more additional nodes, where the third signal may include the indication of the second timing reference quality of the second timing reference. In some aspects, a given node can have multiple synchronization sources. In some instances, the node may need to determine its timing, e.g., by selecting a timing reference or by weighting timing estimates from multiple sources. Accordingly, this determination can become the timing reference for the node. In turn, the node can then broadcast the quality of its timing reference, e.g., there may be one timing reference, to one or more children nodes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
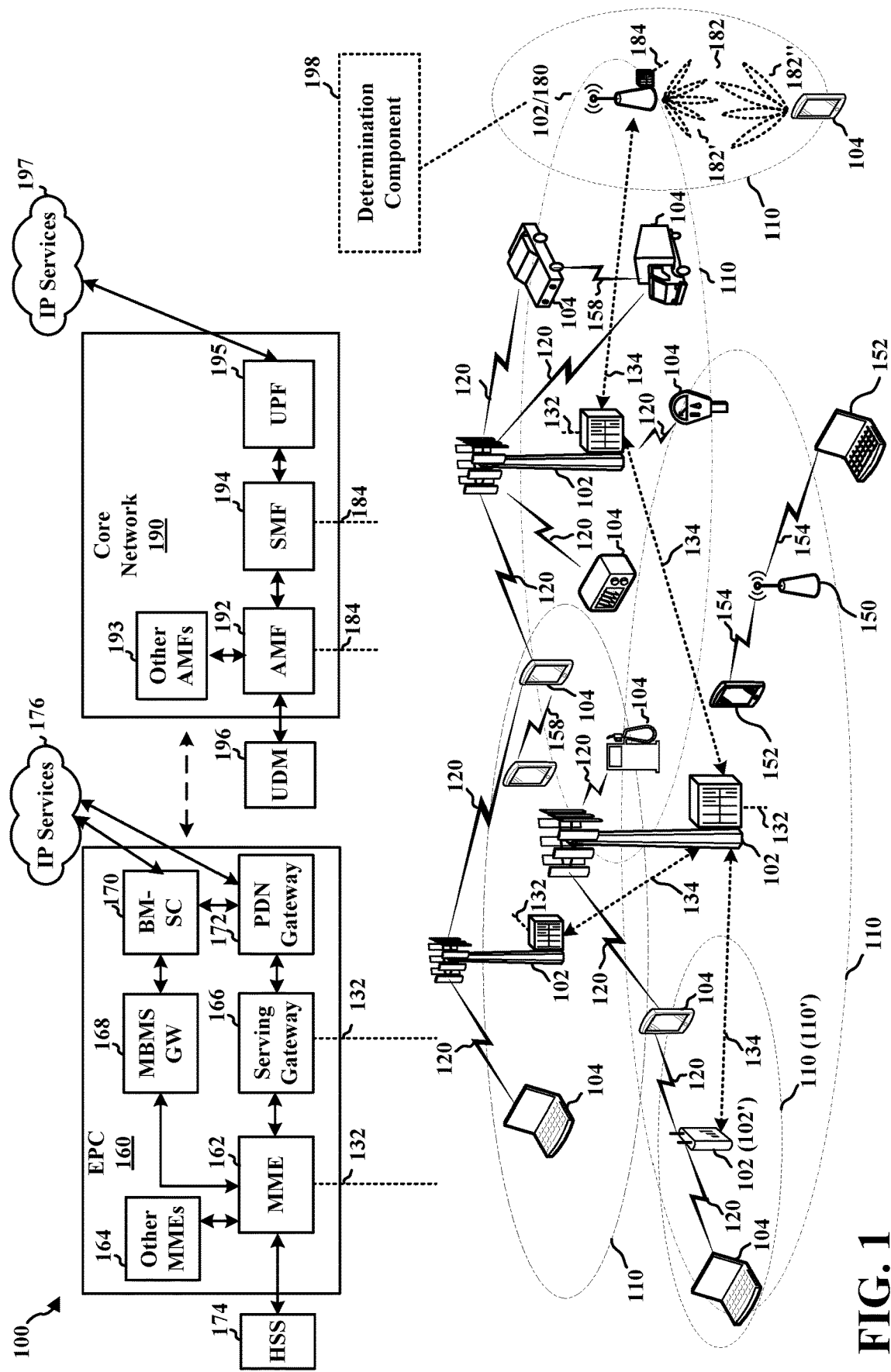
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME®) particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a determination component 198 configured to receive a first signal from a second node of one or more additional nodes, the first signal including at least one first timing reference. The determination component 198 may also be configured to receive an indication of the first timing reference quality of the at least one first timing reference from the second node. The determination component 198 may also be configured to determine a second timing reference quality of the at least one timing reference. The determination component 198 may also be configured to generate the indication of the second timing reference quality of the second timing reference. The determination component 198 may also be configured to adjust the first timing reference quality of the at least one first timing reference. The determination component 198 may also be configured to reduce or increase the first timing reference quality of the at least one first timing reference. The determination component 198 may also be configured to transmit a second signal to at least one node of the one or more additional nodes, the second signal including a second timing reference. The determination component 198 may also be configured to broadcast, to the one or more additional nodes, an indication of a second timing reference quality of the at least one timing reference. The determination component 198 may also be configured to transmit a third signal to the at least one node of the one or more additional nodes, where the third signal may include the indication of the second timing reference quality of the second timing reference. Although the following description may be focused on nodes or wireless devices, the concepts described herein may be applicable to other similar areas, such as 5G NR LTE, LTE-A, CDMA, GSM, and other wireless technologies.

Figure 2:
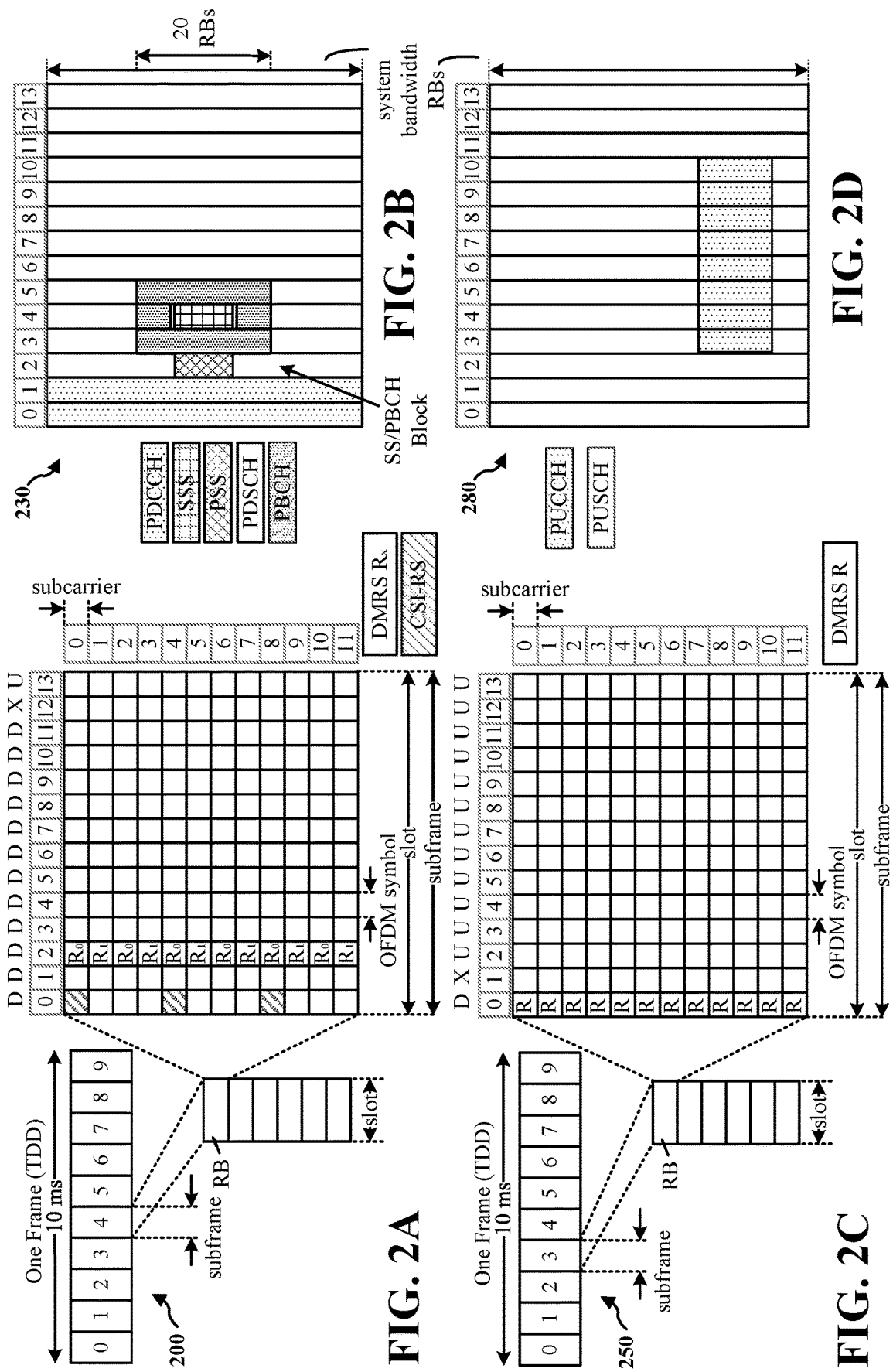
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
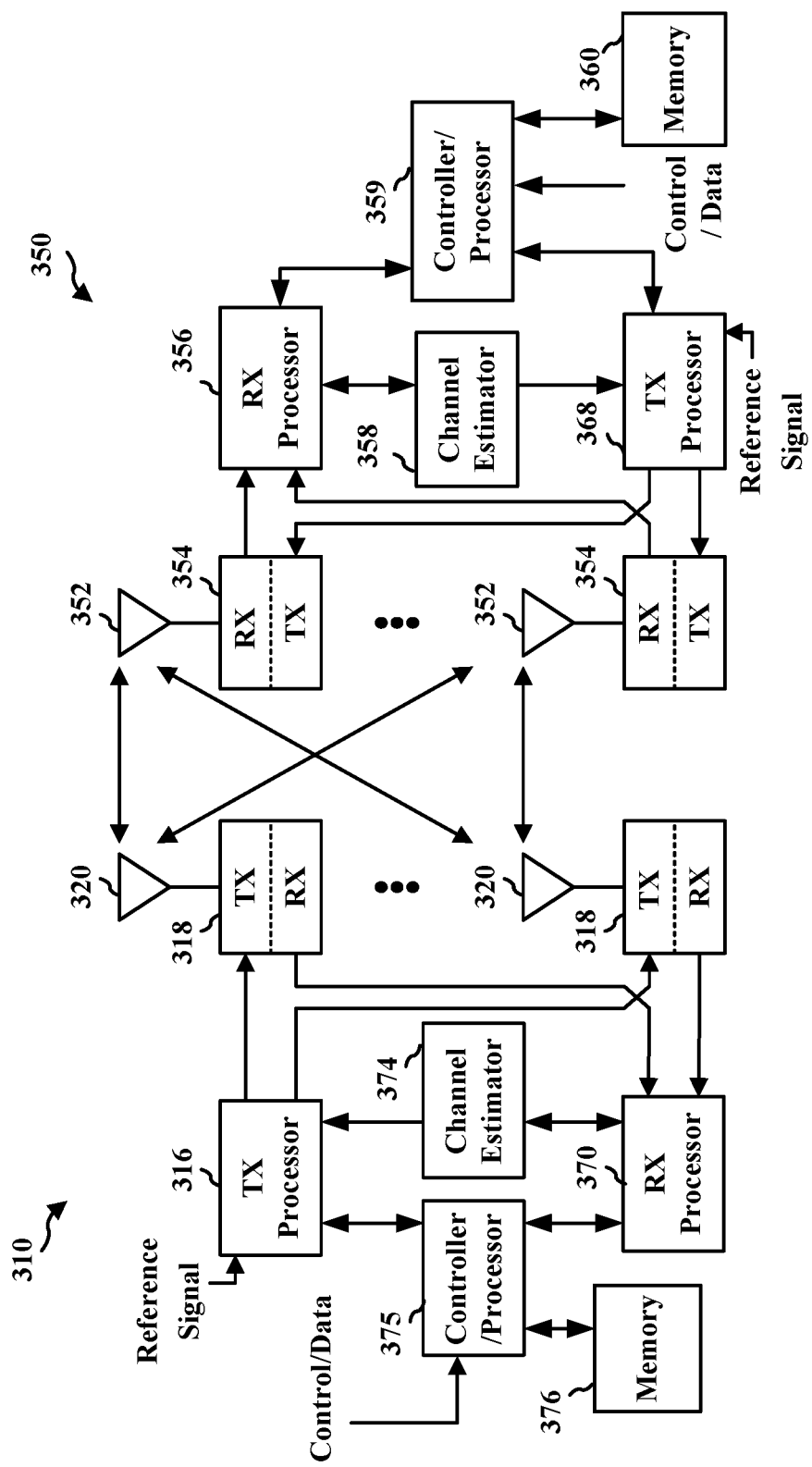
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with determination component 198 of FIG. 1.

In some aspects of wireless communications, synchronization amongst the base stations can be important for the performance of a time division duplex (TDD) cellular network. The absence of frame alignment may cause the downlink and the uplink timeslots to overlap with each other. In some instances, this can lead to intercell interference. Based on shorter symbol durations, some wireless networks, e.g., 5G NR networks, can be even more susceptible to timing misalignments.

Over-the-air (OTA) synchronization is a method for integrated access backhaul (IAB) nodes. In OTA synchronization, a given IAB node can derive an estimate of its downlink transmit timing from a downlink received signal from its parent node, as well as additional information provided by the parent node. In some aspects, the information provided may comprise two quantities: Timing Advance (TA) and T_delta. TA can refer to an existing mechanism primarily used to align the reception of uplink signals from different UEs at the base station. This can be reused in IAB nodes to derive an estimate of the one-way propagation delay between a node and its parent node. T_delta can refer to an additional term provided to a node by its parent node, which represents an additional correction factor to compensate for transmission and/or reception timing misalignment at the parent node. In turn, this can result in TA not being an accurate estimate of the round trip delay between the two nodes. In some aspects of IAB, each IAB node can be time aligned from a downlink signal transmission point of view. In some aspects, nodes can also be referred to as wireless devices.

In some aspects, each IAB node may be subject to the same synchronization accuracy as a base station. For instance, the transmit timing of the downlink may be aligned at all IAB nodes, e.g., while the receive timing of the uplink may correspond to other implementations. Also, the receive timing of the downlink and the transmit timing of the uplink can be utilized. In some aspects, an IAB node can use a method of choice, e.g., a global navigation satellite system (GNSS) receiver, depending on the implementation and/or configuration, in order to meet the synchronization accuracy. Also, OTA synchronization to the parent JAB node(s) may be an additional synchronization method available to an JAB node.

In some instances, as an IAB node may not be precluded from using multiple synchronization sources, the estimate of the node's downlink transmission timing may depend on a selected synchronization source(s). Also, when multiple synchronization sources are available to an IAB node (e.g., a GNSS receiver and OTA synchronization), estimates of the downlink transmission timing may be derived from each source. Moreover, if the IAB node has more than one parent node, each parent may also be considered as a separate synchronization source.

Figure 4:
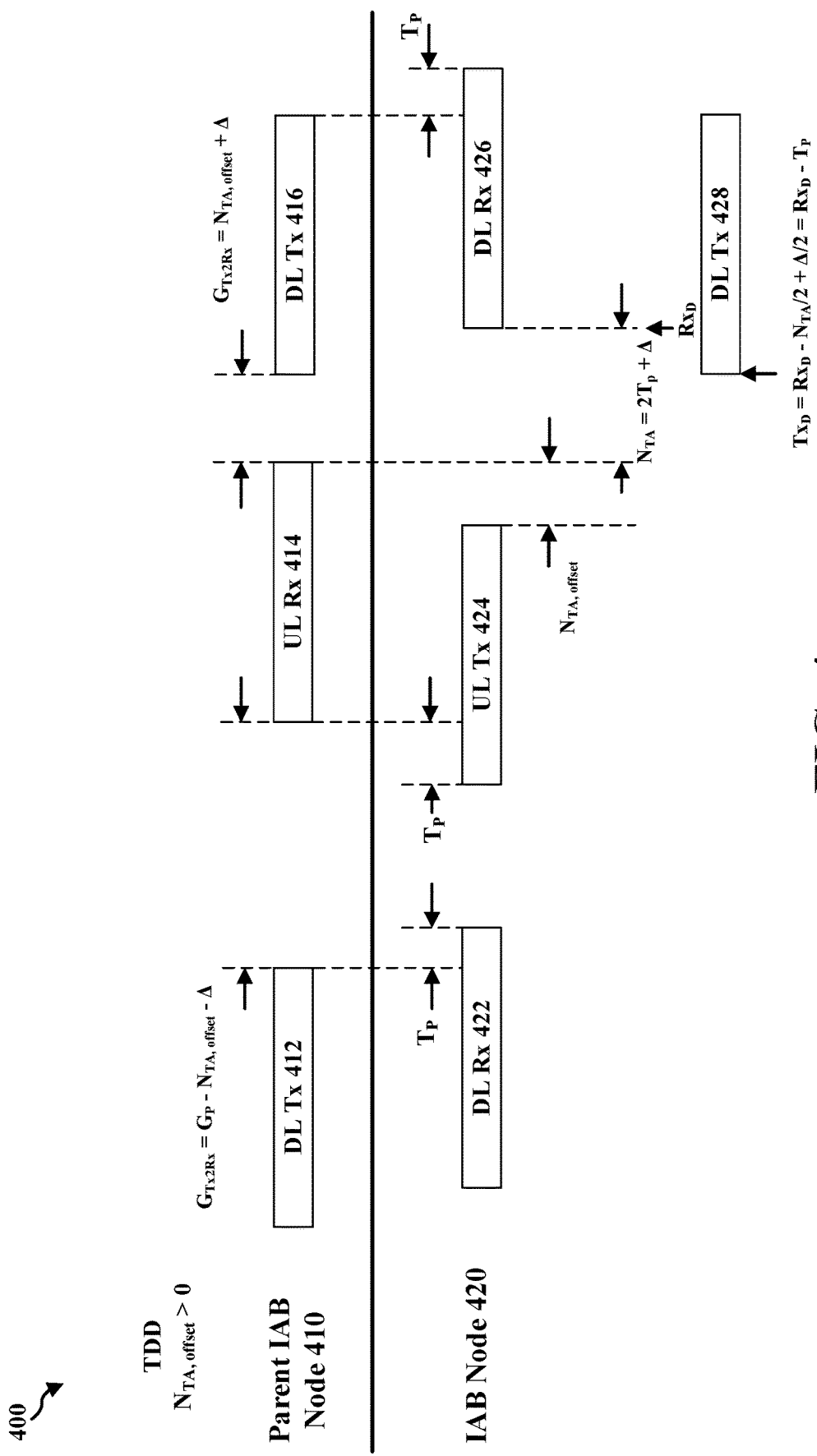
FIG. 4 is a diagram illustrating transmissions between multiple nodes.

FIG. 4 is a diagram 400 illustrating transmissions between multiple nodes. Diagram 400 illustrates TDD communication between an JAB node 420 and its parent JAB node 410. Diagram 400 also include downlink transmission 412, uplink reception 414, downlink transmission 416, downlink reception 422, uplink transmission 424, downlink reception 426, and downlink transmission 428. In diagram 400, TA can be defined by the following formula: $TA = N_{TA} + N_{TA,offset}$. Also, T_delta can be defined by the following formula: $T\_delta = -(N_{TA,offset} + \Delta)/2$, where $\Delta$ is the offset between the downlink timing and the uplink timing at the parent node, which is defined for TDD operations as $\Delta = G_{Rx2Tx} - N_{TA,offset}$. FIG. 4 displays the uplink and downlink transmission and/or reception between the JAB node 420 and its parent JAB node 410. Additionally, FIG. 4 displays $T_p$ which refers to the one way propagation delay, $Tx_D$ which refers to the estimated downlink transmit timing, and $Rx_D$ which refers to the received downlink signal reference. In some aspects, $Tx_D$ can be defined by the following formula:

$$Tx_D = Rx_D - \left(\frac{TA}{2} + T\_delta\right) = Rx_D - \left(\frac{N_{TA} + N_{TA,offset}}{2} - \frac{N_{TA,offset} + \Delta}{2}\right).$$

In some aspects, the value of $\Delta = G_{Rx2Tx} - N_{TA,offset}$ may be an implementation choice for an JAB node and may be a deterministic value, rather than a quantity that may be estimated (and so may apply to the derived value T_delta). As a result, provided the selection of $\Delta$ is done to match one of the values that can be communicated to the children nodes via the selected signaling choice (which may in turn depend on the resolution selected for this value), the value of $\Delta$ may not have an impact on the accuracy of the downlink transmission timing estimate at the children nodes. Additionally, the granularity of T_delta may have no bearing on the accuracy of the downlink transmission timing estimate, provided the JAB node may select a value of $\Delta$ for its transmission or reception alignment that matches one of the available values for T_delta.

In some aspects, the value of $\Delta$ may be relatively static and hence may not be expected to require frequent updates to be sent to the children nodes. A change in the value of $\Delta$ may mean that the uplink reception boundary at the IAB node may be modified, and hence may require the timing advance $N_{TA}$ to be updated accordingly. As a result, T_delta may also be updated in alignment with the associated changes in the timing advance, so that the child node receiving the new timing advance $N_{TA}$ and the new T_delta can apply them at the same in the context of the computation of the downlink transmission timing. Failure to do so, i.e. using inconsistent values of $N_{TA}$ and the new T_delta, may result in a temporary incorrect calculation of the downlink transmission timing.

In addition, consistent values of $N_{TA}$ and T_delta may be made available to a child node in the context of the computation of the downlink transmission timing from OTA synchronization. In some aspects, with the use of OTA based timing derived from the parent node, the synchronization error between two nodes may increase as the number of nodes in between increases due to error propagation. However, certain nodes in the chain may rely on additional synchronization sources, and hence may have the ability to reduce the synchronization error. As a result, these nodes may offer a more reliable timing reference to the downstream nodes. The overall system can benefit if the downstream nodes may be provided with a measure of the reliability of the timing reference of a given parent node, as an appropriate weight factor can be applied to improve the accuracy of the resulting transmission timing estimate.

In some aspects, IAB can support multiple hops. As IAB can support multiple hops, when OTA synchronization is used at every hop, the timing error between two nodes can increase as the number of nodes chained together between them increases. In some instances, this timing error can be based on error propagation. In some aspects, an IAB nodes may provide to its child nodes a measure of the reliability of its timing reference.

Figure 5:
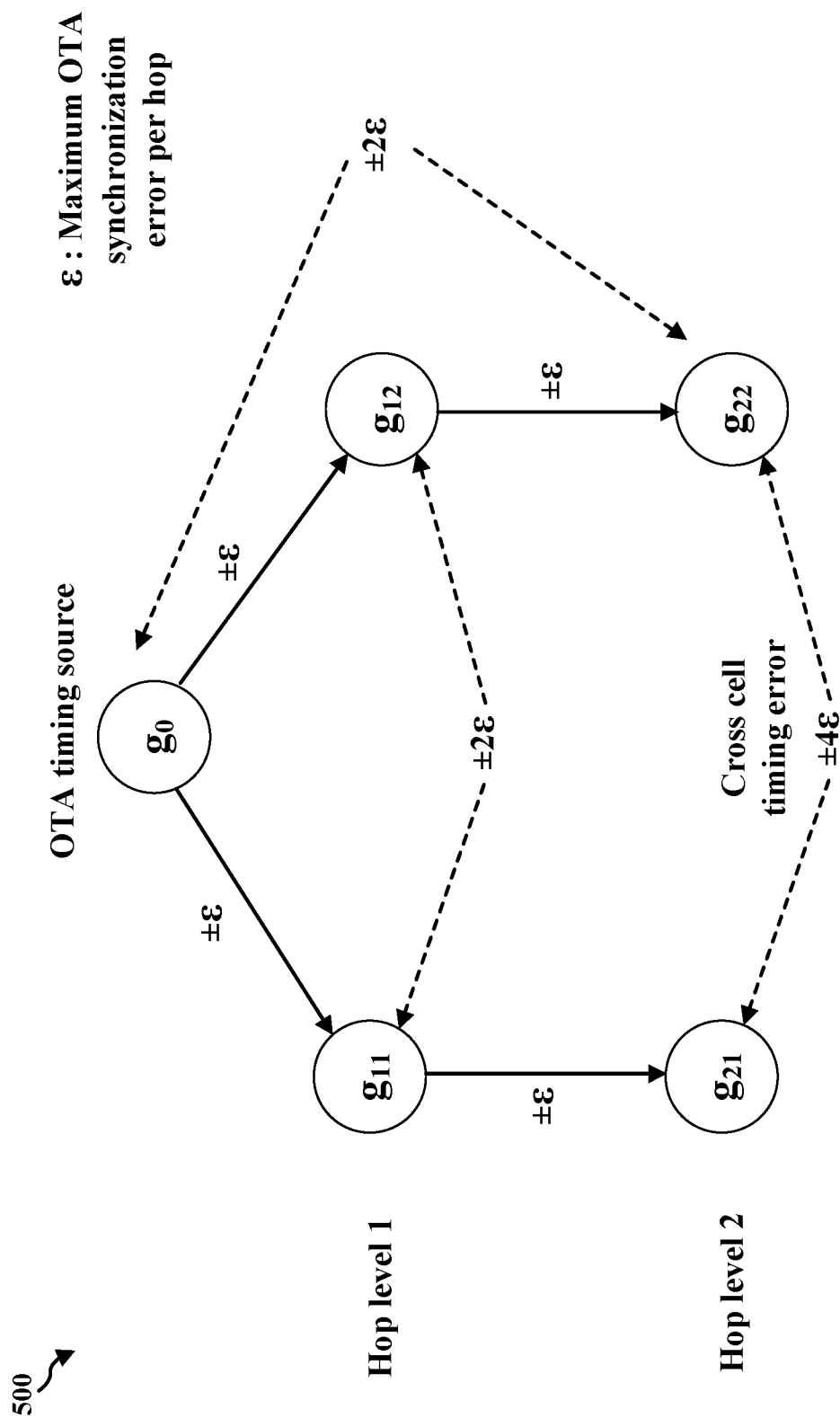
FIG. 5 is a diagram illustrating the timing error between multiple nodes.

FIG. 5 is a diagram 500 illustrating the timing error between multiple nodes. Diagram 500 illustrates an OTA timing sources with two hop levels. As shown in FIG. 5, $\varepsilon$ can represent the maximum OTA synchronization error per hop. In some aspects, the resulting cross cell timing error in an $N_{hop}$ hop IAB network can be large, e.g., the maximum cross cell timing error can be $\pm 2N_{hop}\varepsilon$. Diagram 500 shows a number of nodes or cells, e.g., $g_0$, $g_{11}$, $g_{12}$, $g_{21}$, and $g_{22}$. As shown in FIG. 5, $g_0$ is the OTA timing source, $g_{11}$ and $g_{12}$ are at hop level 1, and $g_{21}$ and $g_{22}$ are at hop level 2. Further, there can be a variety of cross cell timing errors: $\pm\varepsilon$, $\pm 2\varepsilon$, and $\pm 4\varepsilon$.

In some aspects, an IAB node may rely on additional synchronization methods, e.g., not solely on OTA synchronization to the parent node. For instance, when multiple synchronization sources are available to an IAB node, e.g., global navigation satellite system (GNSS) receiver and OTA synchronization, estimates of the downlink transmission timing can be derived from each source. Additionally, in some aspects, if the IAB node has more than one parent node, each parent node can also be considered as a separate synchronization source. Moreover, the IAB node can compute an estimate of its downlink transmission timing (DL_Tx_timings) from each synchronization source (s) that is available to the IAB node. In some aspects, the IAB node can set its downlink transmission timing as equivalent to the following formula: $\Sigma(DL\_Tx\_timings\_s \cdot w_s)$, where $w_s$ is an appropriate weight factor for source s.

As mentioned herein, IAB synchronization among IAB nodes can be achieved via OTA synchronization to the parent node(s). However, additional synchronization sources can also be used at a given node, e.g., GPS sources. In order to minimize the timing error between two nodes in a chain, or conversely to maximize the number of hops that can be supported in IAB, it can be beneficial for a node to determine the reliability of the timing estimate, e.g., provided by a parent node. As indicated previously, aspects of the present disclosure can propose that an IAB node broadcasts a reliability indication of its timing reference.

In some aspects, since an IAB node can rely on additional synchronization methods besides OTA synchronization to its parent IAB node(s), the quality of its downlink transmission timing estimate may vary. In some instances, the synchronization accuracy can be improved when multiple synchronization sources are available. Additionally, system performance can be improved when a higher weight is applied to synchronization estimates coming from more accurate sources. For example, for a given number of hops this can enable tighter synchronization amongst nodes. Also, for a given synchronization, i.e., maximum timing error between nodes, this can allow for a larger number of hops.

Aspects of the present disclosure can allow for an IAB node to broadcast an indication of the quality, which may also be referred to as reliability, of its timing reference. In some aspects, if an IAB node relies on OTA synchronization, the reliability of the timing estimates may be degraded at each hop. Accordingly, each node may add some amount of uncertainty to the reliability received from its parent node. Further, if a node has access to another synchronization source, e.g., a GPS source, it can set the reliability based on the quality of the timing estimate obtained from the GPS engine.

In some aspects, e.g., with the exclusive use of OTA based timing derived from the parent node, the synchronization error between two nodes may generally increase as the number of nodes between them increases, e.g., due to error propagation. However, certain nodes in the chain may rely on additional synchronization sources, and hence have the ability to reduce the synchronization error. As a result, these nodes can offer a more reliable timing reference to the downstream nodes. Also, the overall system can benefit if the downstream nodes can be provided with a measure of the reliability of the timing reference of a given parent node, as an appropriate weight factor can be applied. In turn, this can improve the accuracy of the resulting transmission timing estimate. Accordingly, an IAB node can provide, e.g., to its child nodes, a measure of the reliability of its timing reference.

In some aspects, an IAB node may set its downlink transmission timing ahead of its downlink reception timing by a certain values, e.g., TA/2+T_delta. T_delta may be signaled from the parent node, where the value may be intended to account for factors such as the offset between parent downlink transmission and uplink reception, as well as factors such as transmission to reception switching time and/or hardware impairments. As indicated herein, TA may be the timing gap between uplink transmission timing and downlink reception timing.

Additionally, T_delta may be indicated by a parent to the child node independently from the TA indication from the parent node used to set the uplink transmission timing of the child IAB node. T_delta may also be updated on an aperiodic basis determined by the parent node. Further, the child IAB node may trigger its downlink transmission timing adjustment by TA/2+T_delta after it receives the timing offset T_delta indication from its parent node, e.g., if it is using OTA to obtain its downlink timing.

In some aspects, in order to align the downlink transmission timing of the IAB node with the downlink transmission timing of the parent node, e.g., by setting downlink transmission timing of the IAB node (TA/2+T_delta) ahead of its downlink reception timing, T_delta may be set to −½ of the time interval at the parent node between the start of uplink reception frame, e.g., frame i, for the IAB node and the start of downlink transmission frame, e.g., frame i. In some instances, the TA may be the time interval at the IAB node between the start of uplink transmission frame, e.g., frame i, and the start of downlink reception frame, e.g., frame i.

Figure 6:
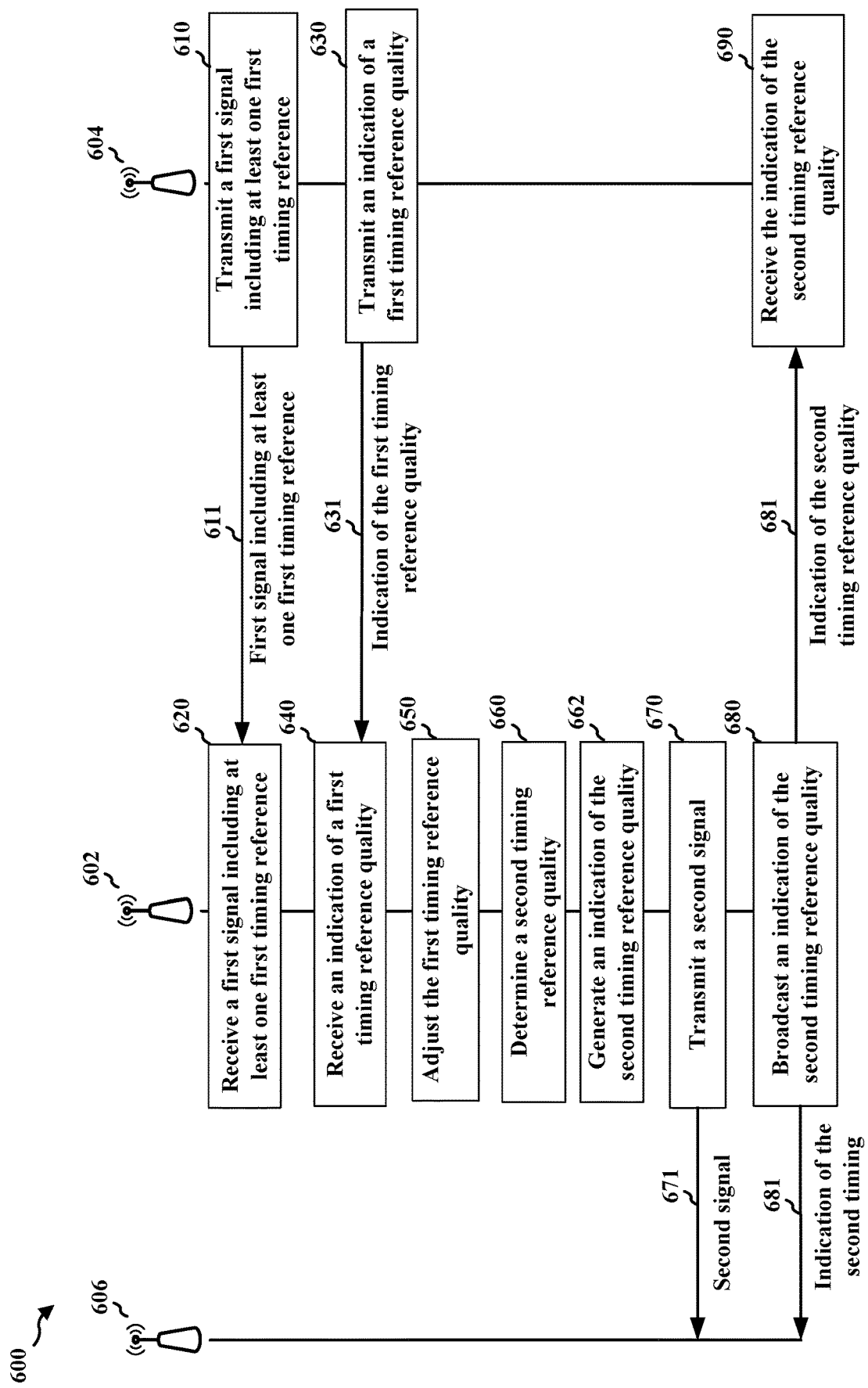
FIG. 6 is a diagram illustrating transmissions between a first node and a second node.

FIG. 6 is a diagram 600 illustrating transmissions between a first node 602, a second node 604, and a third node 606. At 610, the second node 604 can transmit a first signal, e.g., first signal 611, including at least one first timing reference. At 620, first node 602 can receive the first signal, e.g., first signal 611, including at least one first timing reference. At 630, the second node 604 can transmit an indication, e.g., indication 631, of a first timing reference quality of the at least one first timing reference. At 640, the first node 602 can receive the indication, e.g., indication 631, of a first timing reference quality of the at least one first timing reference. In some aspects, although the first signal 611 and the indication 631 are illustrated separately, the first signal 611 and the indication 631 may be signaled together.

At 650, the first node 602 can adjust the first timing reference quality of the at least one first timing reference. Also, the first node 602 can reduce or increase the first timing reference quality of the at least one first timing reference.

In some aspects, a child IAB node may receive a first timing reference from a parent IAB node having a first level of reliability/quality. The child IAB may transmit a second timing reference, e.g., to its one or more child IAB nodes, and may provide an indication of a second level of reliability/quality that is reduced from the first level of reliability/quality of the timing reference provided by the parent IAB. Similarly, any child IAB node that uses the second timing reference from the child IAB (e.g., any IAB nodes that operate with the child IAB node as a parent IAB node) may transmit a third timing reference along with an indication of a third level of reliability/quality that is reduced from the second level of reliability/quality. The process may continue with each child IAB indicating a reduced level of reliability/quality for timing reference signals that it transmits. The first node 602 may transmit its own timing reference signal, e.g., that might be used by third node 606 for synchronization.

At 660, the first node 602 can determine a second timing reference quality of the second timing reference. In some aspects, the determined quality of the second timing reference can be based on the received indication 631 of the quality of the at least one first timing reference. Also, the quality of the at least one first timing reference can be determined based on whether the timing reference is based on OTA synchronization sources or GPS synchronization sources. At 662, the first node 602 can generate an indication of the second timing reference quality of the second timing reference. In some aspects, adjusting the first timing reference quality of the at least one first timing reference may generate the indication of the second timing reference quality of the second timing reference.

At 670, the first node 602 can transmit a second signal, e.g., second signal 671, to at least one node of the one or more additional nodes, e.g., third node 606, the second signal including a second timing reference. In some aspects, the second timing reference can be based on the at least one first timing reference.

At 680, the first node 602 can broadcast, to the one or more additional nodes, an indication of a second timing reference quality of the second timing reference, e.g., indication 681. This broadcast 680 can be received by the second node 604 or one or more additional nodes, e.g., third node 606. Thus, at 690, the second node 604 can receive the indication, e.g., indication 681, of the second timing reference quality of the second one timing reference. Additionally, the first node 602 may transmit a third signal to the at least one node of the one or more additional nodes, where the third signal may include the indication of the second timing reference quality of the second timing reference.

In some aspects, the indication of the second timing reference quality of the second timing reference may include a measurement of the second timing reference quality of the second timing reference. Also, the second timing reference or the second timing reference quality of the second timing reference may be determined based on global positioning system (GPS) synchronization sources. The second timing reference can also be based on the at least one first timing reference. Moreover, the first node and/or the second node can be an IAB node.

In some aspects, a given node can have multiple synchronization sources. In some instances, the node may need to determine its timing, e.g., by selecting a timing reference or by weighting timing estimates from multiple sources. Accordingly, this determination can become the timing reference for the node. In turn, the node can then broadcast the quality of its timing reference, e.g., there may be one timing reference, to one or more children nodes.

Figure 7:
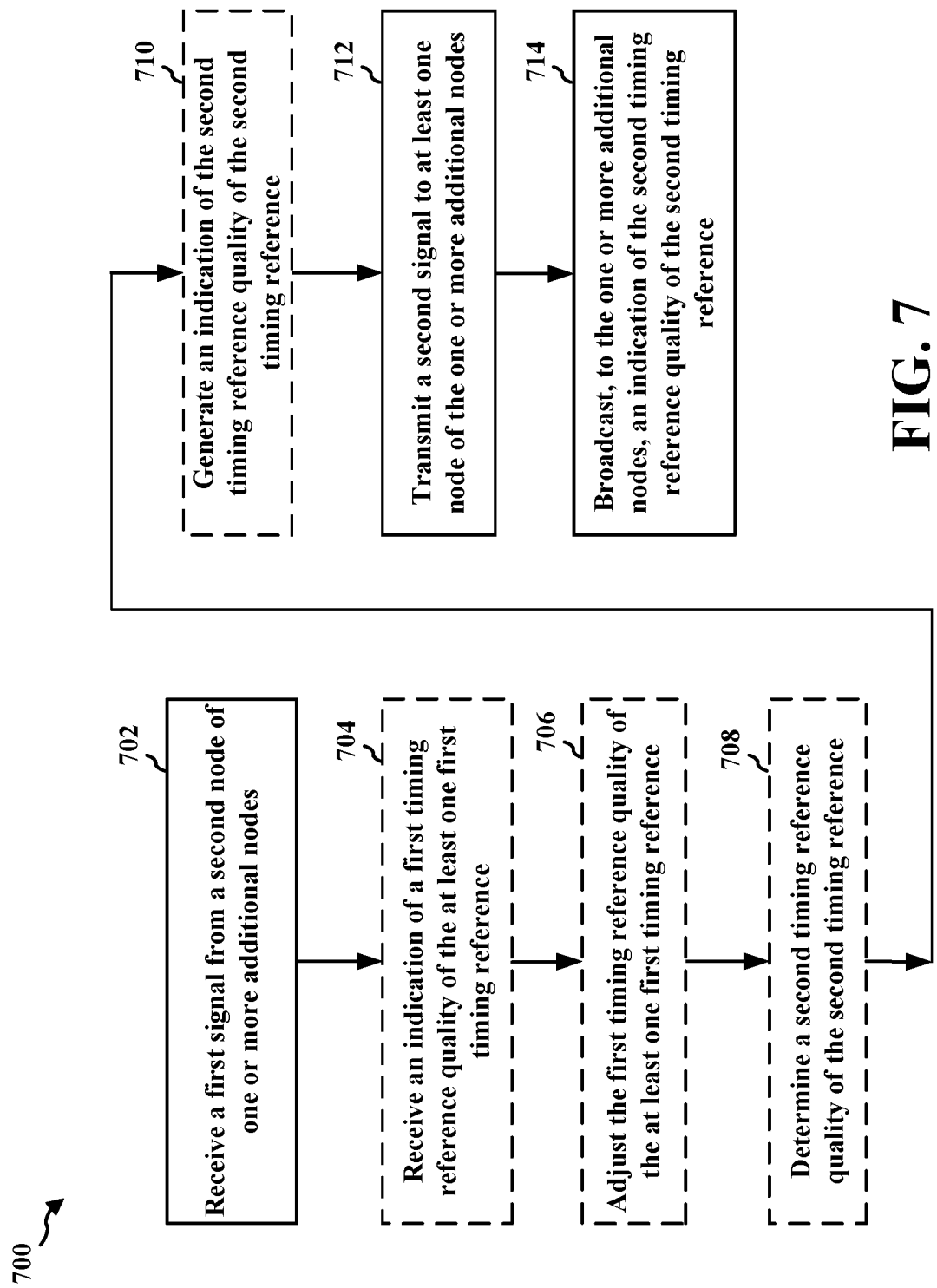
FIG. 7 is a flowchart of a method of wireless communication.

FIG. 7 is a flowchart 700 of a method of wireless communication. The method may be performed by a first node, a component of a first node, a base station, or a component of a base station (e.g., node 850, base station 102, 180, 310, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits or advantages, such as improving communication signaling, resource utilization, and/or power savings.

At 702, the first node can receive a first signal from a second node of one or more additional nodes, the first signal including at least one first timing reference, as described in connection with the examples in FIGS. 4-6. For example, reception component 804 of apparatus 802 may receive a first signal from a second node of one or more additional nodes.

At 704, the first node can receive an indication of a first timing reference quality of the at least one first timing reference from a second node, as described in connection with the examples in FIGS. 4-6. For example, reception component 804 of apparatus 802 may receive an indication of a first timing reference quality of the at least one first timing reference from a second node.

At 706, the first node can adjust the first timing reference quality of the at least one first timing reference, as described in connection with the examples in FIGS. 4-6. For example, adjustment component 808 of apparatus 802 may adjust the first timing reference quality of the at least one first timing reference. Also, the first node can reduce or increase the first timing reference quality of the at least one first timing reference, as described in connection with the examples in FIGS. 4-6. For example, adjustment component 808 of apparatus 802 may reduce or increase the first timing reference quality of the at least one first timing reference.

At 708, the first node can determine a second timing reference quality of the second timing reference, as described in connection with the examples in FIGS. 4-6. For example, determination component 806 of apparatus 802 may determine a second timing reference quality of the second timing reference. In some aspects, the determined quality of the second timing reference can be based on the received indication of the quality of the at least one first timing reference, as described in connection with the examples in FIGS. 4-6. Also, the quality of the at least one first timing reference can be determined based on whether the timing reference is based on OTA synchronization sources or GPS synchronization sources, as described in connection with the examples in FIGS. 4-6.

At 710, the first node can generate an indication of the second timing reference quality of the second timing reference, as described in connection with the examples in FIGS. 4-6. For example, generation component 810 of apparatus 802 may generate an indication of the second timing reference quality of the second timing reference. In some aspects, adjusting the first timing reference quality of the at least one first timing reference may generate the indication of the second timing reference quality of the second timing reference, as described in connection with the examples in FIGS. 4-6.

At 712, the first node can transmit a second signal to at least one node of the one or more additional nodes, the second signal including a second timing reference, as described in connection with the examples in FIGS. 4-6. For example, transmission component 812 of apparatus 802 may transmit a second signal to at least one node of the one or more additional nodes. In some aspects, the second timing reference can be based on the at least one first timing reference, as described in connection with the examples in FIGS. 4-6.

At 714, the first node can broadcast, to the one or more additional nodes, an indication of a second timing reference quality of the second timing reference, as described in connection with the examples in FIGS. 4-6. For example, transmission component 812 of apparatus 802 may broadcast, to the one or more additional nodes, an indication of a second timing reference quality of the second timing reference. This broadcast can be received by the second node or one or more additional nodes, as described in connection with the examples in FIGS. 4-6. Additionally, the first node may transmit a third signal to the at least one node of the one or more additional nodes, where the third signal may include the indication of the second timing reference quality of the second timing reference, as described in connection with the examples in FIGS. 4-6.

In some aspects, the indication of the second timing reference quality of the second timing reference may include a measurement of the second timing reference quality of the second timing reference, as described in connection with the examples in FIGS. 4-6. Also, the second timing reference or the second timing reference quality of the second timing reference may be determined based on global positioning system (GPS) synchronization sources, as described in connection with the examples in FIGS. 4-6. The second timing reference can also be based on the at least one first timing reference, as described in connection with the examples in FIGS. 4-6. Moreover, the first node and/or the second node can be an IAB node, as described in connection with the examples in FIGS. 4-6.

Figure 8:
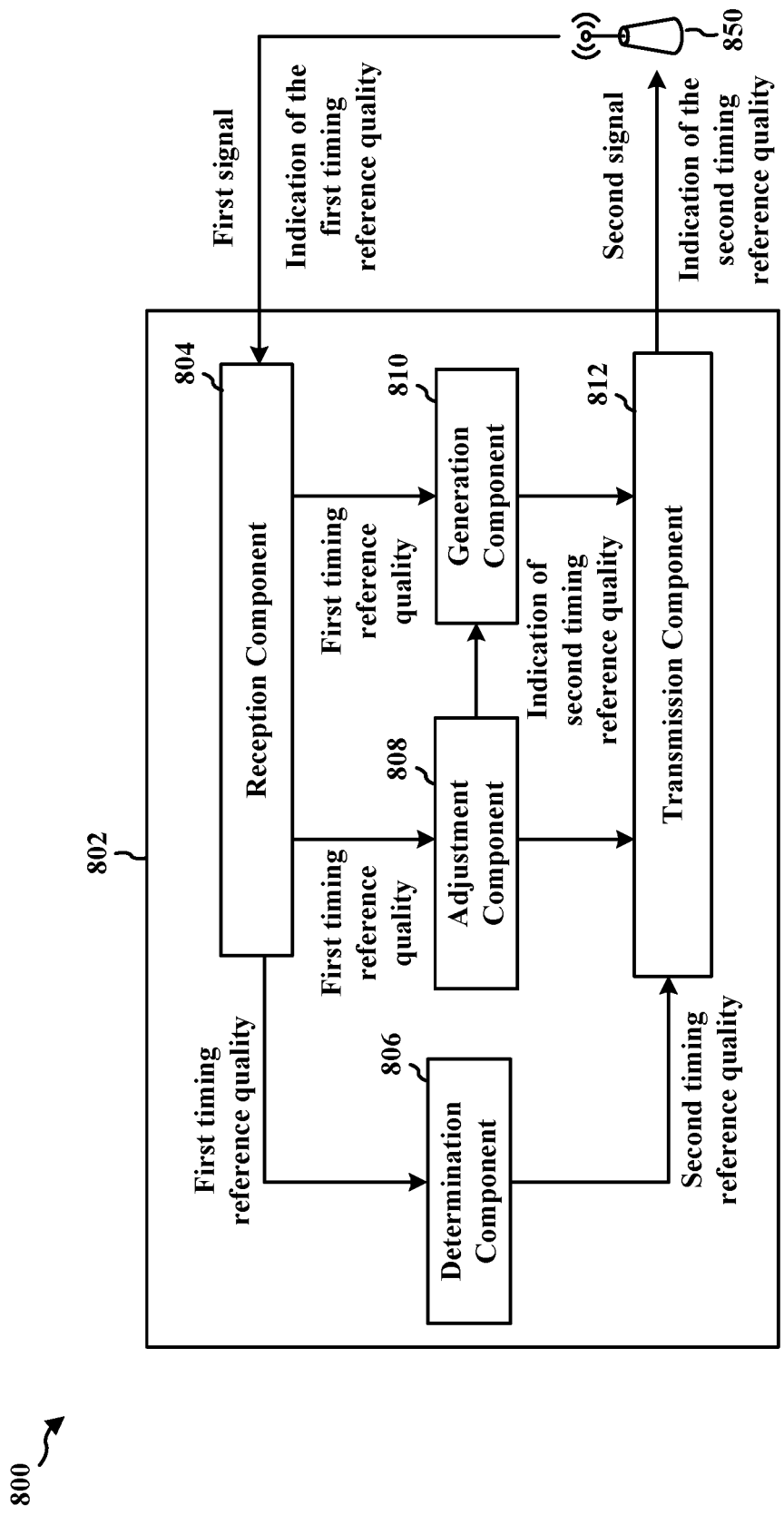
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a node, a component of a node, a base station, or a component of a base station (e.g., base station 102, 180, 310, or node, 602, 604, 606). The apparatus includes a reception component 804 that is configured to receive a first signal from a second node of one or more additional nodes, the first signal including at least one first timing reference, e.g., as described in connection with step 702 in FIG. 7. Reception component 804 can also be configured to receive an indication of a first timing reference quality of the at least one first timing reference, e.g., as described in connection with step 704 in FIG. 7. The apparatus also includes a determination component 806 that is configured to determine a second timing reference quality of the second timing reference, e.g., as described in connection with step 708 in FIG. 7. The apparatus also includes an adjustment component 808 that is configured to adjust the first timing reference quality of the at least one first timing reference, e.g., as described in connection with step 706 in FIG. 7. The apparatus also includes a generation component 810 that is configured to generate an indication of the second timing reference quality of the second timing reference, e.g., as described in connection with step 710 in FIG. 7. The apparatus also includes a transmission component 812 that is configured to transmit a second signal to at least one node of the one or more additional nodes, the second signal including a second timing reference, e.g., as described in connection with step 712 in FIG. 7. Transmission component 812 can also be configured to broadcast, to the one or more additional nodes, an indication of a second timing reference quality of the second timing reference, e.g., as described in connection with step 714 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
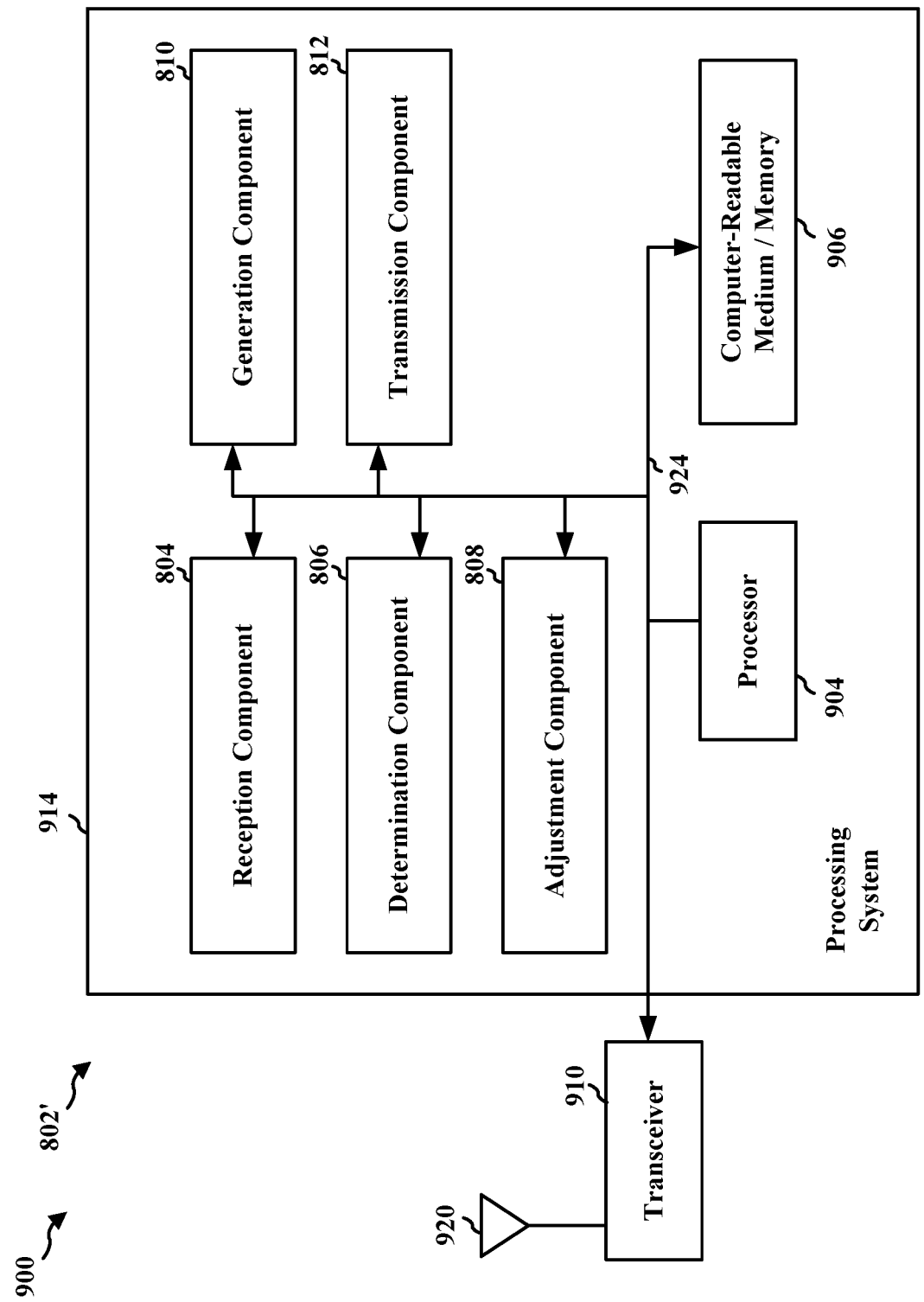
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375. Alternatively, the processing system 914 may be the entire base station (e.g., see 310 of FIG. 3).

In one configuration, the apparatus 802/802' for wireless communication includes means for receiving a first signal from a second node of one or more additional nodes, the first signal including at least one first timing reference. The apparatus can also include means for transmitting a second signal to at least one node of the one or more additional nodes, the second signal including a second timing reference. The apparatus can also include means for broadcasting, to the one or more additional nodes, an indication of a second timing reference quality of the second timing reference. The apparatus can also include means for determining a second timing reference quality of the second timing reference prior to transmitting the second signal. The apparatus can also include means for receiving an indication of a first timing reference quality of the at least one first timing reference from the second node. The apparatus can also include means for adjusting the first timing reference quality of the at least one first timing reference. The apparatus can also include means for reducing or increasing the first timing reference quality of the at least one first timing reference. The apparatus can also include means for generating the indication of the second timing reference quality of the second timing reference. The apparatus can also include means for transmitting a third signal to the at least one node of the one or more additional nodes, where the third signal includes the indication of the second timing reference quality of the second timing reference.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first node, comprising:
   receiving, from a second node of one or more additional nodes, a first signal, the first signal including at least one first timing reference;
   receiving, from the second node, an indication of a first timing reference quality of the at least one first timing reference;
   adjusting the first timing reference quality of the at least one first timing reference, wherein adjusting the first timing reference quality of the at least one first timing reference generates an indication of a second timing reference quality of a second timing reference;
   transmitting, to at least one node of the one or more additional nodes, a second signal, the second signal including the second timing reference; and
   broadcasting, to the one or more additional nodes, the indication of the second timing reference quality of the second timing reference.

2. The method of claim 1, further comprising:
   determining the second timing reference quality of the second timing reference prior to transmitting the second signal.

3. The method of claim 2, wherein the second timing reference or the second timing reference quality of the second timing reference is determined based on global positioning system (GPS) synchronization sources.

4. The method of claim 1, wherein adjusting the first timing reference quality of the at least one first timing reference further comprises:
   reducing or increasing the first timing reference quality of the at least one first timing reference.

5. The method of claim 1, further comprising:
   generating the indication of the second timing reference quality of the second timing reference.

6. The method of claim 1, wherein broadcasting the indication of the second timing reference quality of the second timing reference further comprises:
   transmitting a third signal to the at least one node of the one or more additional nodes, wherein the third signal includes the indication of the second timing reference quality of the second timing reference.

7. The method of claim 1, wherein the indication of the second timing reference quality of the second timing reference includes a measurement of the second timing reference quality of the second timing reference.

8. The method of claim 1, wherein at least one of the first node or the second node is an integrated access backhaul (IAB) node.

9. The method of claim 1, wherein the second timing reference is based on the at least one first timing reference.

10. An apparatus for wireless communication of a first node, comprising:
    a memory; and at least one processor coupled to the memory and configured to:
  receive, from a second node of one or more additional nodes, a first signal, the first signal including at least one first timing reference;
  receive, from the second node, an indication of a first timing reference quality of the at least one first timing reference;
  adjust the first timing reference quality of the at least one first timing reference wherein to adjust the first timing reference quality of the at least one first timing reference generates an indication of a second timing reference quality of a second timing reference;
  transmit, to at least one node of the one or more additional nodes, a second signal, the second signal including the second timing reference; and
  broadcast, to the one or more additional nodes, the indication of the second timing reference quality of the second timing reference.

11. The apparatus of claim 10, wherein the at least one processor is further configured to:
  determine the second timing reference quality of the second timing reference prior to transmitting the second signal.

12. The apparatus of claim 11, wherein the second timing reference or the second timing reference quality of the second timing reference is determined based on global positioning system (GPS) synchronization sources.

13. The apparatus of claim 10, wherein to adjust the first timing reference quality of the at least one first timing reference further comprises the at least one processor configured to:
  reduce or increase the first timing reference quality of the at least one first timing reference.

14. The apparatus of claim 10, wherein the at least one processor is further configured to:
  generate the indication of the second timing reference quality of the second timing reference.

15. The apparatus of claim 10, wherein to broadcast the indication of the second timing reference quality of the second timing reference further comprises the at least one processor configured to:
  transmit a third signal to the at least one node of the one or more additional nodes, wherein the third signal includes the indication of the second timing reference quality of the second timing reference.

16. The apparatus of claim 10, wherein the indication of the second timing reference quality of the second timing reference includes a measurement of the second timing reference quality of the second timing reference.

17. The apparatus of claim 10, wherein at least one of the first node or the second node is an integrated access backhaul (IAB) node.

18. The apparatus of claim 10, wherein the second timing reference is based on the at least one first timing reference.

19. An apparatus for wireless communication of a first node, comprising:
  means for receiving, from a second node of one or more additional nodes, a first signal, the first signal including at least one first timing reference;
  means for receiving, from the second node, an indication of a first timing reference quality of the at least one first timing reference;
  means for adjusting the first timing reference quality of the at least one first timing reference, wherein adjusting the first timing reference quality of the at least one first timing reference generates an indication of a second timing reference quality of a second timing reference;
  means for transmitting, to at least one node of the one or more additional nodes, a second signal, the second signal including the second timing reference; and
  means for broadcasting, to the one or more additional nodes, the indication of the second timing reference quality of the second timing reference.

20. The apparatus of claim 19, further comprising:
  means for determining the second timing reference quality of the second timing reference prior to transmitting the second signal.

21. The apparatus of claim 19, wherein adjusting the first timing reference quality of the at least one first timing reference further comprises:
  means for reducing or increasing the first timing reference quality of the at least one first timing reference.

22. A non-transitory computer-readable medium storing computer executable code for wireless communication of a first node, the code when executed by a processor causes the processor to:
  receive, from a second node of one or more additional nodes, a first signal, the first signal including at least one first timing reference;
  receive, from the second node, an indication of a first timing reference quality of the at least one first timing reference;
  adjust the first timing reference quality of the at least one first timing reference, wherein to adjust the first timing reference quality of the at least one first timing reference generates an indication of a second timing reference quality of a second timing reference;
  transmit, to at least one node of the one or more additional nodes, a second signal, the second signal including the second timing reference; and
  broadcast, to the one or more additional nodes, the indication of the second timing reference quality of the second timing reference.

* * * * *